US012103407B2

(12) United States Patent
Alobaidi et al.

(10) Patent No.: US 12,103,407 B2
(45) Date of Patent: Oct. 1, 2024

(54) MOBILE, NESTING, BATTERY POWERED KIOSK

(71) Applicant: Green Cubes Technology, LLC, Kokomo, IN (US)

(72) Inventors: Mohammed Alobaidi, Kokomo, IN (US); Calvin Ting, Kokomo, IN (US); Goo Sung, Kokomo, IN (US)

(73) Assignee: Green Cubes Technology, LLC, Kokomo, IN (US)

( * ) Notice: Subject to any disclaimer, the term of this patent is extended or adjusted under 35 U.S.C. 154(b) by 458 days.

(21) Appl. No.: 17/420,900

(22) PCT Filed: Jan. 7, 2020

(86) PCT No.: PCT/US2020/012510
§ 371 (c)(1),
(2) Date: Jul. 6, 2021

(87) PCT Pub. No.: WO2020/146329
PCT Pub. Date: Jul. 16, 2020

(65) Prior Publication Data
US 2022/0089041 A1    Mar. 24, 2022

Related U.S. Application Data

(60) Provisional application No. 62/788,999, filed on Jan. 7, 2019.

(51) Int. Cl.
*B60L 50/60* (2019.01)
*B60L 53/14* (2019.01)
(Continued)

(52) U.S. Cl.
CPC ............. *B60L 50/66* (2019.02); *B60L 53/14* (2019.02); *B60L 53/80* (2019.02); *G06Q 20/18* (2013.01);
(Continued)

(58) Field of Classification Search
CPC .......... B60L 50/66; B60L 53/14; B60L 53/80; G06Q 20/18; G06Q 30/06; G07F 7/0627;
(Continued)

(56) References Cited

U.S. PATENT DOCUMENTS 4,545,591 A * 10/1985 Balha .................... B62B 3/1404
280/33.994
5,250,789 A * 10/1993 Johnsen ................ B62B 3/1424
705/14.4

(Continued)

FOREIGN PATENT DOCUMENTS

CN    108831318 A  * 11/2018
CN    109147626 A  *  1/2019
(Continued)

OTHER PUBLICATIONS

International Searching Authority, International Search Report, PCT/US20/12510, Dated Dec. 21, 2020.
(Continued)

*Primary Examiner* — Steve Clemmons
(74) *Attorney, Agent, or Firm* — Reichel Stohry Dean LLP; Mark C. Reichel; Natalie J. Dean

(57) ABSTRACT

Disclosed herein are mobile battery powered kiosks generally shaped as a standing workstation having an interactive touch screen at a comfortable viewing height and a wheeled base portion for convenient rolling transportation. These mobile kiosks may have collapsible handles and may be nested together for more compact storage and more efficient battery charging, such as by daisy chaining These mobile kiosks may have removable or swappable rechargeable batteries, or may be recharged simply by plugging into a wall outlet. The mobile kiosks have an interactive touch screen, which may itself be a computer, or may be operably coupled to a computer, such as via Wi-Fi. These mobile kiosks may be used at a point-of sale and are wheeled and
(Continued)

lightweight to be easily maneuvered and quickly deployed when needed, such as at crowded venues, or on a temporary as-needed basis, and can then be put away, when no longer needed.

19 Claims, 4 Drawing Sheets

(51) Int. Cl.
- *B60L 53/80* (2019.01)
- *G06Q 20/18* (2012.01)
- *H02J 7/00* (2006.01)
- *G06F 3/0484* (2022.01)

(52) U.S. Cl.
CPC .......... *H02J 7/0013* (2013.01); *G06F 3/0484* (2013.01); *H02J 7/0063* (2013.01)

(58) Field of Classification Search
CPC .......... G07F 7/40; G07F 9/0484; G07F 9/002; G07F 9/10; G07F 17/40; Y02T 10/70; Y02T 10/7072; Y02T 90/01
See application file for complete search history.

(56) References Cited

U.S. PATENT DOCUMENTS

| | | | | |
|---|---|---|---|---|
| 5,348,324 | A * | 9/1994 | Trotta | A47B 81/061 280/47.35 |
| 6,289,326 | B1 * | 9/2001 | LaFleur | A47B 81/065 312/258 |
| 6,484,939 | B1 * | 11/2002 | Blaeuer | G07G 1/0081 235/383 |
| 6,722,673 | B1 * | 4/2004 | Hamlin | A47B 21/06 108/50.01 |
| 7,267,216 | B1 | 9/2007 | Chang | |
| 7,445,215 | B2 | 11/2008 | Prather et al. | |
| 7,594,668 | B2 * | 9/2009 | Arceta | A61G 12/001 280/47.35 |
| 8,116,081 | B2 * | 2/2012 | Crick, Jr. | G09F 27/00 361/728 |
| 8,152,062 | B2 * | 4/2012 | Perrier | B62B 3/1416 361/759 |
| 8,567,798 | B2 | 10/2013 | Rossini et al. | |
| 9,242,664 | B2 * | 1/2016 | Arceta | A61G 12/001 |
| 9,666,194 | B2 * | 5/2017 | Ondeck | G11B 27/031 |
| 9,705,359 | B2 | 7/2017 | Boyd et al. | |
| 10,210,503 | B2 * | 2/2019 | Sonnendorfer | G06Q 20/3276 |
| 10,339,515 | B1 * | 7/2019 | Johnson | B62B 3/1444 |
| 10,817,907 | B2 * | 10/2020 | Walker | A47F 5/108 |
| 11,008,034 | B2 * | 5/2021 | Anderson | B62B 5/082 |
| 11,155,290 | B2 * | 10/2021 | Yokoyama | B62B 3/1424 |
| 11,299,188 | B2 * | 4/2022 | Yokoyama | G07G 1/0081 |
| 11,356,569 | B2 * | 6/2022 | Kline | G07F 17/26 |
| 2004/0165348 | A1 | 8/2004 | Clark et al. | |
| 2005/0125386 | A1 * | 6/2005 | Diebold | G06Q 30/06 |
| 2006/0254861 | A1 | 11/2006 | Perrier et al. | |
| 2008/0231228 | A1 | 9/2008 | Fowler et al. | |
| 2008/0272578 | A1 | 11/2008 | Tsai | |
| 2012/0296751 | A1 * | 11/2012 | Napper | G06Q 20/208 705/23 |
| 2014/0236728 | A1 * | 8/2014 | Wright | G06Q 30/0261 705/14.66 |
| 2018/0004840 | A1 * | 1/2018 | Herbelin | H04L 65/762 |
| 2019/0266585 | A1 * | 8/2019 | Johnson | G06Q 20/204 |
| 2021/0247807 | A1 * | 8/2021 | Ney | A47B 83/001 |
| 2021/0365915 | A1 * | 11/2021 | Kaufman | G06Q 20/203 |

FOREIGN PATENT DOCUMENTS

| | | | | |
|---|---|---|---|---|
| GB | 2534371 | A * | 7/2016 | ............ B62B 1/125 |
| KR | 20110096997 | A * | 8/2011 | |
| KR | 20160136496 | A * | 11/2016 | |
| WO | WO-9304449 | A1 * | 3/1993 | ......... B62B 3/1408 |
| WO | WO-2015085370 | A1 * | 6/2015 | ......... G09F 15/0056 |

OTHER PUBLICATIONS

International Searching Authority, Written Opinion of the International Searching Authority, PCT/US20/12510, Dated Dec. 21, 2020.
Canadian Intellectual Property Office, Examiners Requisition, Canadian Application No. 3,123,454, Dated Jan. 22, 2024.

* cited by examiner

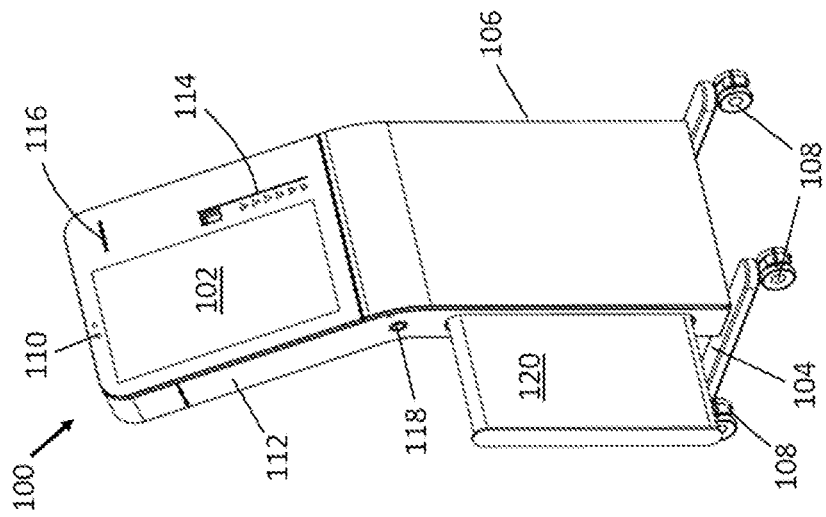
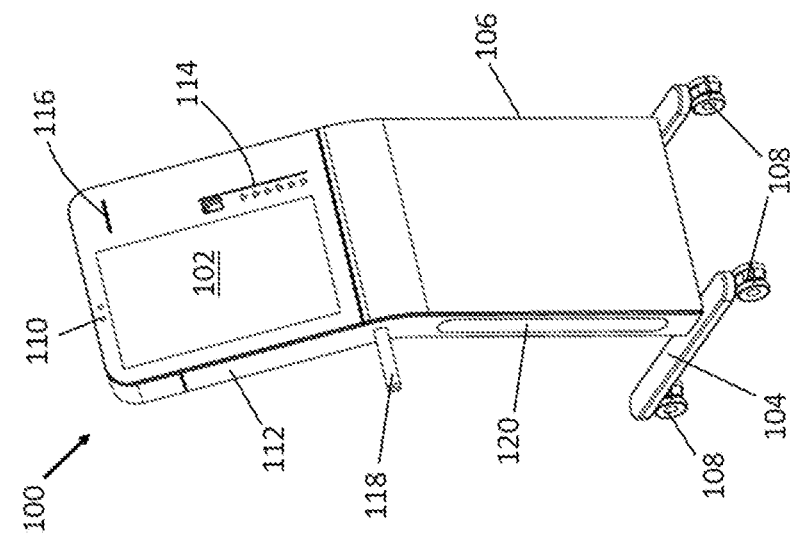
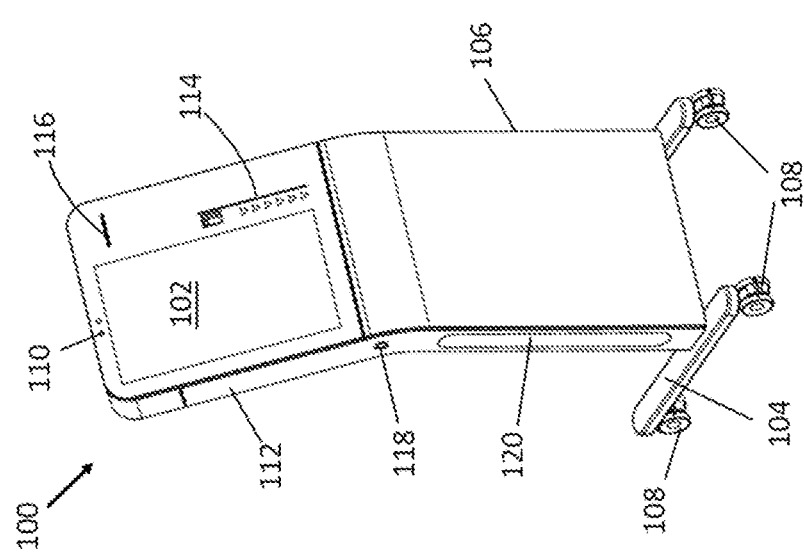

MOBILE, NESTING, BATTERY POWERED KIOSK

PRIORITY

The present application related to, and claims the priority benefit of, U.S. Provisional Patent Application Ser. No. 62/788,999, filed Jan. 7, 2019, the contents of which are incorporated herein directly and by reference in their entirety.

BACKGROUND

With the internet and technology constantly evolving, consumers are better able to operate this technology themselves and to identify, to the most miniscule detail, exactly what they want. Consumers also expect things very quickly. The retail, food, and beverage industries know what consumers want, and they know that consumers expect it fast. Some fast food restaurants and other businesses have started using kiosks so their customers can order their own food and/or pick out the exact items they want to purchase. This allows the customers to personalize and/or purchase exactly what they want without any miscommunication between them and the customer service representative. By removing a potential miscommunication, confrontation, or confusing situation with a customer service representative, the business is giving the consumer a better ordering experience using familiar technology, while the business is improving its customer service.

Currently available kiosks need to be plugged into an outlet, which means the kiosk must be incorporated into the company's interior design from the onset of construction, or require expensive construction/renovations to subsequently hardwire these kiosks into the interior design of the store or restaurant, and/or require extension cords which present a dangerous hazard for trip and fall accidents. This presents a need for a battery powered mobile kiosk that can be moved around anywhere, as needed, without the need for expensive hardwiring or adding plugs to create a permanent structure within a store/restaurant's interior design. These mobile battery powered kiosks can be rolled out when needed, (such as for large events at arenas, stadiums, concerts, large events, etc., where there may not be a power supply/plug-in available) and then simply rolled back into a storage area and put away when they are not needed.

Since the purpose of a mobile battery powered kiosk is to be used on an as-needed basis, it would be ideal for these kiosks to nest or stack together. These kiosks will be further designed to charge while nested or stacked together, so that they take up minimal storage space, and can be designed with the store or restaurant's brand/logo so that they don't look out of place. The power and charging system will allow the stack of nested kiosks to charge all the same time, with only one being plugged in, such as by daisy chaining.

BRIEF SUMMARY OF THE INVENTION

The present disclosure includes disclosure of a mobile battery powered kiosk, comprising: a wheeled frame having an upright portion and a handle coupled thereto; an interactive touch screen mounted to the upright portion of the wheeled frame and operably coupled to a computer having Wi-Fi or other wireless communication capability; and a battery operably coupled to the interactive touch screen to provide power thereto.

The present disclosure also includes disclosure of the mobile battery powered kiosk wherein the wheeled frame, and upright portion thereof, are sized and shaped to nest with similar wheeled frames, and upright portions thereof, of other mobile battery powered kiosks, allowing multiple mobile battery powered kiosks to be stacked or nested together for compact storage.

The present disclosure also includes disclosure of the mobile battery powered kiosk, wherein the wheeled frame, and upright portion thereof, is lightweight aluminum to provide easy rolling transport.

The present disclosure also includes disclosure of the mobile battery powered kiosk wherein the handle is a collapsible handle.

The present disclosure also includes disclosure of the mobile battery powered kiosk wherein the handle is a pull-out collapsible handle.

The present disclosure also includes disclosure of the mobile battery powered kiosk wherein the collapsible handle folds downward to lie flat against the vertical portion of the wheeled frame.

The present disclosure also includes disclosure of the mobile battery powered kiosk wherein the upright portion is at a comfortable adult-standing height.

The present disclosure also includes disclosure of the mobile battery powered kiosk wherein the interactive touch screen securely mounted to the upright portion of the wheeled frame is positioned at a comfortable viewing height for a standing user.

The present disclosure also includes disclosure of the mobile battery powered kiosk wherein the interactive touch screen is itself a computer and is further coupled to at least one other computer via Wi-Fi or Bluetooth communications.

The present disclosure also includes disclosure of the mobile battery powered kiosk further comprising at least one of: GPS, a camera, a printer, a credit card reader, and/or a money slot and/or change dispenser.

The present disclosure also includes disclosure of the mobile battery powered kiosk wherein the battery is rechargeable.

The present disclosure also includes disclosure of the mobile battery powered kiosk wherein the battery is removable for charging.

The present disclosure also includes disclosure of the mobile battery powered kiosk wherein the battery is not removable and is charged within the mobile battery powered kiosk by plugging into a power outlet.

The present disclosure also includes disclosure of the mobile battery powered kiosk further comprising security features to securely lock wheels on the wheeled frame, battery, interactive touch screen, and a money slot or change dispenser, to prevent theft or unauthorized tampering.

The present disclosure also includes disclosure of the mobile battery powered kiosk wherein the battery can be charged when nested or stacked together with other kiosks via a daisy chain.

The present disclosure also includes disclosure of the mobile battery powered kiosk wherein the interactive touch screen is removable from the upright portion of the wheeled frame.

The present disclosure also includes disclosure of the mobile battery powered kiosk forming part of a system for nesting multiple mobile battery powered kiosks together, the system further comprising at least one other mobile battery powered kiosk, by connecting the mobile battery powered kiosk to the at least one other mobile battery powered kiosk for compact storage and battery recharging.

The present disclosure also includes disclosure of the system, wherein the at least one other mobile battery powered kiosk comprises a wheeled frame having an upright portion, and wherein the mobile battery powered kiosk is nested together with the at least one other mobile battery powered kiosk, by pushing the wheeled frame and the upright portions together.

The present disclosure also includes disclosure of the system, wherein the mobile battery powered kiosk and at least one other mobile battery powered kiosk may be charged together simultaneously by daisy chaining when nested together.

The present disclosure also includes disclosure of the system, wherein the at least one other mobile battery powered kiosk further comprises a collapsible handle, and wherein the collapsible handle is recessed or retracted into the upright portion when nested together with the mobile battery powered kiosk.

The present disclosure also includes disclosure of the system, wherein the at least one other mobile battery powered kiosk further comprises an interactive touch screen securely mounted to the upright portion of the wheeled frame positioned at a comfortable viewing height for a standing user.

The present disclosure also includes disclosure of the system, further comprising security features positioned on the wheeled frame of the at least one other mobile battery powered kiosk to prevent theft or unauthorized tampering.

The present disclosure also includes disclosure of the system, wherein the interactive touch screen of the at least one other mobile battery powered kiosk is itself a computer and is further coupled to at least one other computer via Wi-Fi or Bluetooth communications.

The present disclosure also includes disclosure of the system, further comprising at least one of: Bluetooth, GPS, a camera, a printer, a credit card reader, and/or a money slot and/or change dispenser.

The present disclosure also includes disclosure of the system, wherein the at least one other mobile battery powered kiosk further comprises a battery, and wherein the battery is not removable and is charged by plugging into a power outlet.

The present disclosure also includes disclosure of the system, wherein the battery is removable from the at least one other mobile battery powered kiosk for recharging.

The present disclosure also includes disclosure of the system, wherein the battery of the mobile battery powered kiosk and the battery of the at least one other mobile battery powered kiosk can be charged when nested or stacked together with other kiosks via a daisy chain.

The present disclosure also includes disclosure of a method for nesting multiple battery powered kiosks together, comprising: guiding the wheeled frame of the mobile battery powered kiosk of claim 1 into alignment with a wheeled frame of another mobile battery powered kiosk, such that the mobile battery powered kiosk and the another mobile battery powered kiosk nest together for compact storage and battery recharging.

The present disclosure also includes disclosure of the method, further comprising electrically coupling the mobile battery powered kiosk with the another mobile battery powered kiosk, when they are nested together, such that both the mobile battery powered kiosk and the another mobile battery powered kiosk can be charged simultaneously via a single plug-in.

The present disclosure also includes disclosure of the method, wherein the step of guiding the wheeled frame of the mobile battery powered kiosk into alignment with the another mobile battery powered kiosk, automatically results in electrically coupling the mobile battery powered kiosk and the another mobile battery powered kiosk together for battery charging.

The present disclosure also includes disclosure of the method, further comprising the step of running system diagnostics to identify and correct maintenance problems.

The present disclosure also includes disclosure of the method, wherein the battery of the mobile battery powered kiosk can be swapped out when nested together with the another mobile battery powered kiosk.

The present disclosure also includes disclosure of the method, wherein the method further comprises activating a lockable security feature on the wheeled frame of the mobile battery powered kiosk to prevent theft or unauthorized tampering.

The present disclosure includes disclosure of a system for nesting multiple mobile battery powered kiosks together, comprising: at least one mobile battery powered kiosk, comprising: a wheeled frame having an upright portion; an interactive touch screen securely mounted to the upright portion of the wheeled frame and operably coupled to a computer having Wi-Fi or other wireless communication capability; and a battery secured within the upright portion of the wheeled frame and electrically coupled to the interactive touch screen to provide power thereto; and wherein the at least one mobile battery powered kiosk is nested together with at least one other mobile battery powered kiosk, by pushing the wheeled frame and upright portions together, to align and nest closely together for compact storage and efficient battery recharging.

The present disclosure includes disclosure of the system, wherein the at least one mobile battery powered kiosk and the at least one other mobile battery powered kiosk may be charged together simultaneously by daisy chaining when nested.

The present disclosure includes disclosure of the system, wherein the upright portion of the at least one mobile battery powered kiosk further comprises a collapsible handle.

The present disclosure includes disclosure of the system, wherein the collapsible handle is recessed or retracted into the upright portion when nested together with the at least one other mobile battery powered kiosk.

The present disclosure includes disclosure of the system, wherein the interactive touch screen securely mounted to the upright portion of the wheeled frame is positioned at a comfortable viewing height for a standing user.

The present disclosure includes disclosure of the system, wherein the interactive touch screen is itself a computer and is further coupled to at least one other computer via Wi-Fi or Bluetooth communications.

The present disclosure includes disclosure of the system, further comprising at least one of: Bluetooth, GPS, a camera, a printer, a credit card reader, and/or a money slot and/or change dispenser.

The present disclosure includes disclosure of the system, wherein the battery is not removable and is charged by plugging into a power outlet.

The present disclosure includes disclosure of the system, wherein the battery is removable for recharging.

The present disclosure includes disclosure of the system, wherein the at least one mobile battery powered kiosk further comprises security features positioned on the wheeled frame to prevent theft.

The present disclosure includes disclosure of a method for nesting multiple mobile battery powered kiosks together, comprising: positioning at least one mobile battery powered kiosk, wherein the at least one mobile battery powered kiosk comprises: a wheeled frame having an upright portion coupled thereto; an interactive touch screen securely mounted to the upright portion of the wheeled frame and operably coupled to a computer having Wi-Fi or other wireless communication capability; and a battery operably coupled to the interactive touch screen for providing power thereto; and guiding the wheeled frame of the at least one mobile battery powered kiosk into alignment with a wheeled frame of another mobile battery powered kiosk, such that they nest together for compact storage and battery recharging.

The present disclosure includes disclosure of the method, further comprising the step of electrically coupling the at least one mobile battery powered kiosk with the another mobile battery powered kiosk, when they are nested together, such that both the at least one mobile battery powered kiosk and the another mobile battery powered kiosk are charged simultaneously via a single plug-in.

The present disclosure includes disclosure of the method, wherein the step of guiding the mobile battery powered kiosk into alignment with the another mobile battery powered kiosk, automatically results in electrically coupling together the mobile battery powered kiosk and the another mobile battery powered kiosk for battery charging.

The present disclosure includes disclosure of the method, further comprising the step of running system diagnostics to identify and correct maintenance problems.

The present disclosure includes disclosure of the method, wherein the battery of the at least one mobile battery powered kiosk can be swapped out when nested together with the another mobile battery powered kiosk.

The present disclosure includes disclosure of the method, wherein the method further comprises activating a lockable security feature positioned on the wheeled frame to secure the at least one mobile battery powered kiosk.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein:

FIG. 1A illustrates a perspective view of an embodiment of a mobile battery powered kiosk having a pull-out transport handle in the collapsed position and a slide-out removable battery fully inserted therein;

FIG. 1B illustrates a perspective view of an embodiment of a mobile battery powered kiosk having a pull-out transport handle in the extended, or pulled-out, position;

FIG. 1C illustrates a perspective view of an embodiment of a mobile battery powered kiosk having a slide-out battery partially inserted therein;

Figure 2B:
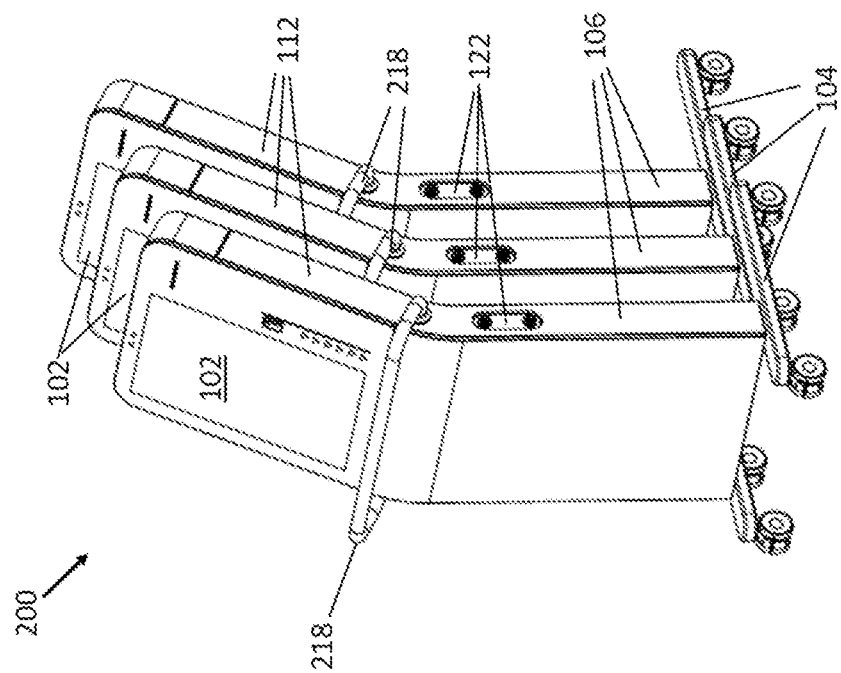
FIG. 2B illustrates a perspective view of an embodiment of the nesting/stacking capability of the mobile battery powered kiosks having collapsible or folding handles.

As such, an overview of the features, functions and/or configurations of the components depicted in the various figures will now be presented. It should be appreciated that not all of the features of the components of the figures are necessarily described and some of these non-discussed features (as well as discussed features) are inherent from the figures themselves. Other non-discussed features may be inherent in component geometry and/or configuration. Furthermore, wherever feasible and convenient, like reference numerals are used in the figures and the description to refer to the same or like parts or steps. The figures are in a simplified form and not to precise scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes various mobile battery powered kiosks, systems, and methods for operating, transporting, charging, and nesting/stacking/storing these mobile battery powered kiosks. These mobile battery powered kiosks may generally comprise any combination of the following features/accessories: a computer, interactive touchscreen, camera, handle(s), base portion, a removable or non-removable battery and/or onboard power supply, power charging port, printer, credit card reader, money slot and/or change provider, wireless fidelity ("Wi-Fi"), Bluetooth, and/or GPS. The mobile battery powered kiosk designs are not limited to the embodiments shown herein, as they may vary in look, size, shape, and accessories based upon each customer's requirements.

Figure 2A:
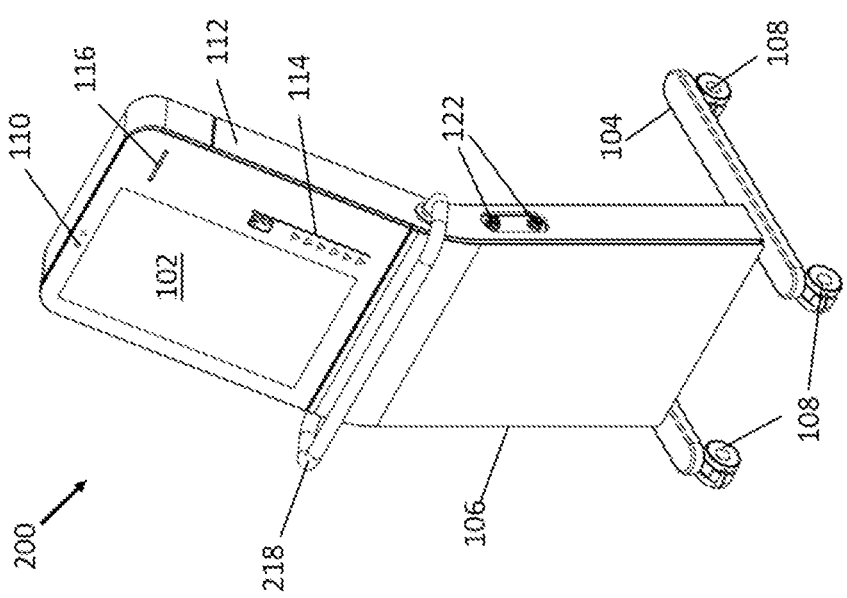
FIG. 2A illustrates a perspective view of an embodiment of a mobile battery powered kiosk having a collapsible or folding handle and charging port for charging a non-removable battery.
Figure 3:
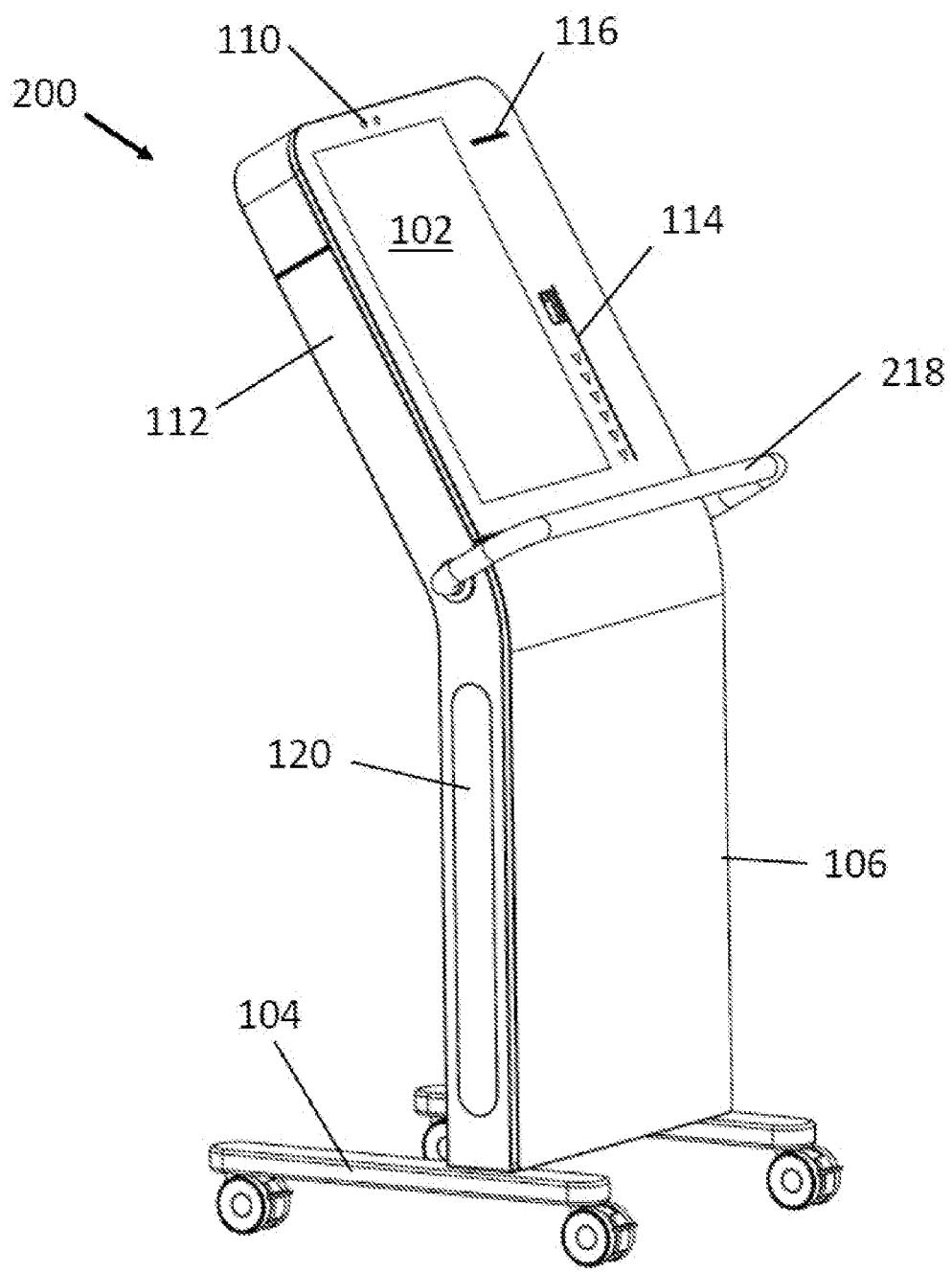
FIG. 3 illustrates a perspective view of an embodiment of a mobile battery powered kiosk having a collapsible or folding handle and a slide-out or removable battery.

In a first embodiment, shown in FIGS. 1A-1C and 2A-2B, a mobile battery powered kiosk 100, 200 (also referred to as a "mobile kiosk," "kiosk," or "battery powered kiosk" herein) is generally shaped as a standing height workstation having an interactive touch screen 102 at a comfortable viewing height, and a wheeled (108) base portion 104 coupled together via a thin, light vertical frame 106. The base portion 104 may generally comprise a horizonal metal frame having wheels or casters 108 thereon for rolling transport of the mobile kiosk 100, 200. As shown in FIGS. 1A and 2A, a first embodiment of a mobile battery powered kiosk 100, 200 may have 3, 4, or more wheels 108 for transport, but any number, size and shape of wheels 108 may be used herein. Additionally, the wheels 108 may also be lockable and/or retractable or capable of being lockably recessed or hidden, as an added security feature to prevent unauthorized movement, or theft of, the mobile kiosks 100, 200.

The interactive touch screen 102 may also be any size and shape and may be secured within an upright (or generally vertical) portion of the upper frame 112, as shown in FIGS. 1A and 2A. The upper frame 112 may be generally vertical and/or be angled away from the viewer/customer to provide optimal visibility of interactive touch screen 102, so customers can comfortably operate the touch screen 102 themselves, to make their own point-of-sale selections. The interactive touch screen 102 itself may comprise a computer or processor, and/or may be operably/electrically coupled to a computer, Wi-Fi, Bluetooth, and/or GPS (not shown) in order to communicate the information received from the touch screen 102 to a central order fulfillment center, such as a kitchen, for example. The touch screen 102 may also run a user-friendly program that appeals to, or is familiar to, a large variety of users/consumers, such as using lots of simple large sized icons/pictures to facilitate a point-of-sale transaction, for example. The interactive touch screen 102 and/or computer (not shown) may be Wi-Fi or Bluetooth operable to communicate with other computers and/or a control center or CPU, such as for fulfilling the customer orders placed via the mobile kiosks 100, 200. The GPS may be used for security, to track the location of the mobile kiosks 100, 200, and/or to help prevent theft of the mobile kiosks and/or to locate any mobile kiosks 100, 200 which may have been moved without authorization.

With continuing reference to the mobile kiosk 100, 200 embodiments shown in FIGS. 1A-1C and 2A-2B, the touch screen 102, or upper frame 112 surrounding and supporting the touch screen (shown generally as frame 112) may also include a camera 110 for recording, security, or customer service monitoring purposes. The frame 112 surrounding the touch screen 102, and/or the thin vertical frame 106, may also optionally include a credit card reader 114, and/or a printer 116, and/or a money slot and/or change provider (not shown), as shown in FIGS. 1A-1C and 2A. Depending upon the needs of each consumer, these mobile battery powered kiosks 100, 200 may be customized to include some combination of these accessories. For example, some mobile battery powered kiosks 100, 200 may be configured only for credit card (reader 114) use, and won't include a money slot and/or change provider (not shown). In other embodiments, the mobile battery powered kiosks 100, 200 may be configured for use with both cash and credit cards and thus, may include both the credit card reader 114 and money slot and/or change provider (not shown). In these embodiments, the money slot and/or change provider would optionally be securely lockable to prevent theft.

The mobile battery powered kiosks 100, 200 may also include handles 118, 218 for easily maneuvering, pushing, and/or rolling the mobile kiosks 100, 200 between locations. A first embodiment 100, shown in FIGS. 1A and 1B, illustrates a pull-out or pop-out handle 118. The pull-out handle 118 may simply be pulled out to help a user push or maneuver the kiosk 100 into position, and then may be pushed in, recessed, or otherwise collapsed to provide a more compact design profile when the handle 118 is not needed. As shown in FIG. 1B, the handle 118 may be pulled out of frame 106/112 and/or away from frame 106/112 when needed. FIGS. 1A and 1C illustrate handle 118 in a collapsed or recessed configuration.

In another embodiment 200, shown in FIGS. 2A, 2B, 3 and 4, the mobile battery powered kiosk 200 may include a larger folding handle 218. In the embodiment 200 shown in FIGS. 2A, 2B, 3, and 4, the larger u-shaped or bar-like handle 218 may be folded down to rest adjacent to, or collapse flush against, the frame 106 when desired. As shown in FIG. 2B, the handles 218 may remain extended even when the kiosks 200 are nested or stacked together. However, in other embodiments, the handles 218 may be collapsed when the kiosks 200 are nested or stacked together, for more compact storage, for example. In this manner, the handles 218 of kiosks 200 are adjustable (i.e., foldable/collapsible) for more a more compact profile/design when the handles 218 are not needed, such as during transport of multiple kiosks 200, or while in storage and/or during battery 120 charging.

With reference to FIGS. 1A and 2A, the battery powered mobile kiosks 100, 200 may also include a battery 120 operably coupled to the electronic components (interactive touch screen 102, camera 110, credit card reader 114, printer 116, computer (not shown), etc.) of the kiosks 100, 200 to provide power thereto. The mobile kiosk 200 shown in FIGS. 2A and 2B may contain a non-removable battery (not shown) within the frame 106. In this embodiment 200, the mobile kiosk 200 may have a charging port 122 thereon, electrically coupled to the battery 120, for providing power to the battery 120 (i.e., recharging the battery), such as by plugging the kiosk 200 into a wall outlet. A user can recharge the battery 120 by simply by plugging the kiosk 200 (via charging port 122) into a wall outlet when needed.

Figure 4:
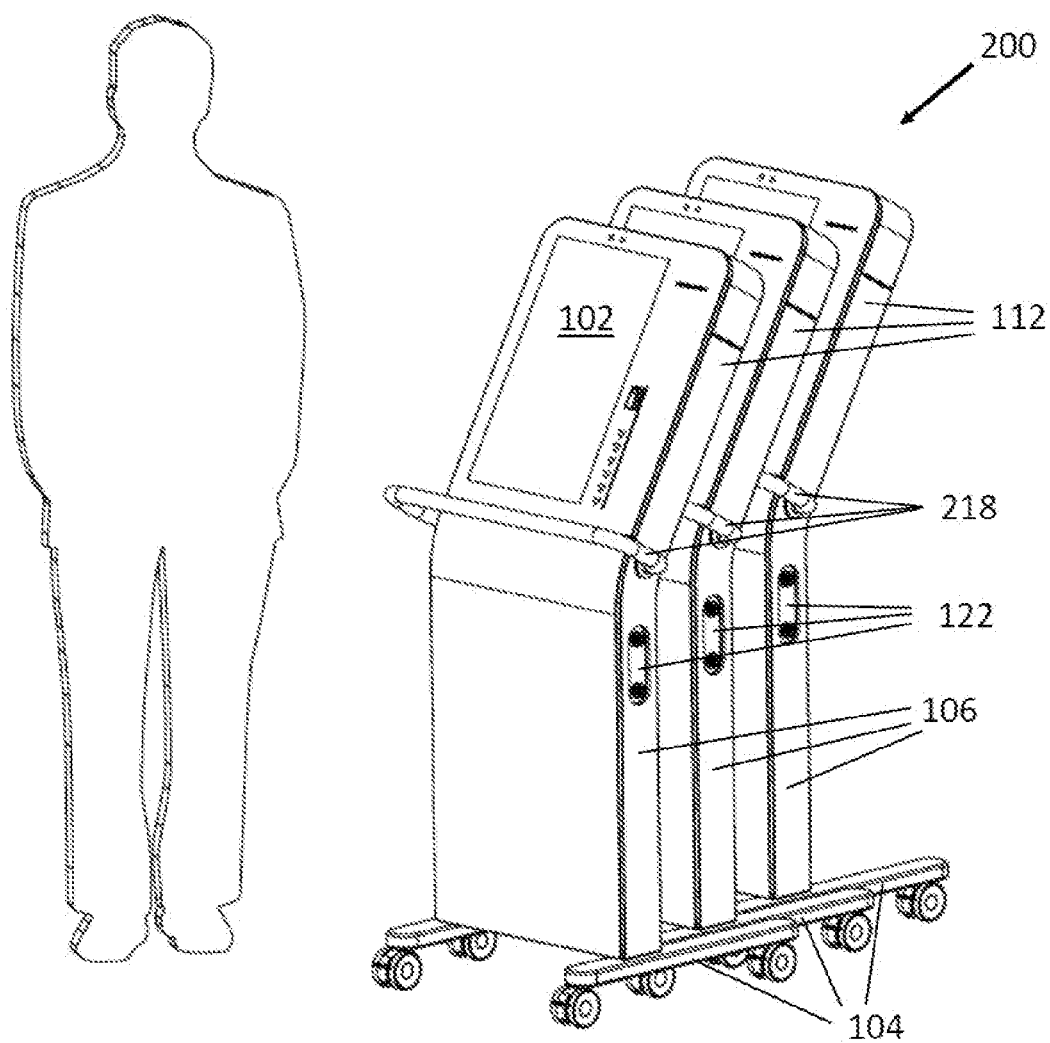
FIG. 4 illustrates a perspective view of an embodiment of the nesting/stacking capability of the mobile battery powered kiosks herein.

The battery 120 disclosed herein may be a lithium battery, for example, and may be large enough to provide battery power for at least 8 hours and/or the length required by most customers for events, concerts, a typical employee work shift, etc. The battery 120 can be recharged, such as by plugging the kiosk 200 into a wall outlet (via charging port 122) and/or by replacing or swapping the battery 120 with another fully charged battery 120. The kiosks 100, 200 can be charged simultaneously when nested or stacked together, in a daisy chain, such as shown in FIG. 4, for example. Employees can recharge and/or replace batteries 120 between shifts, for example, and battery life is anticipated to be customizable for consumer needs.

FIG. 1C illustrates an example of kiosk 100 having a slide out, removable, or swappable battery 120. In this embodiment 100, the battery 120 may be housed within the vertical portion of frame 106, as best shown in FIGS. 1A and 1C. In this embodiment 100, the battery 120 may be easily slid out of the side of frame 106 for convenient swapping and/or charging of the battery 120, as shown in FIG. 1C for example. It should be understood that the battery compartment (shown generally as 120 in FIG. 1A) itself may also be lockable or otherwise secured, to prevent theft or unauthorized removal of the battery 120.

Alternatively, FIG. 2A illustrates an example of kiosk 200 having a non-removable battery 120. In this embodiment 200, the battery 200 (not shown) may also be housed within the vertical portion of the frame 106 and electrically coupled to charging port 122, for charging. However, this battery 120 may not be removed from frame 106 as it may be recharged while remaining within the kiosk 200, such as by coupling the charging port 122 (coupled to battery 120) to a standard wall outlet for charging. For example, when the mobile battery powered kiosks 200 are nested or stacked together for storage, as shown in FIG. 2B, the batteries 120 may be recharged by electrically coupling the kiosks 200, via charging port 122, with a wall outlet or other power charging unit (not shown), such via as a plug-in cord. In some embodiments, simply pushing the mobile kiosks 200 closely together may couple electrical connections between each mobile kiosk 200 (i.e., by aligning electrical coupling components) such that they are electrically coupled whenever they are nested together.

As shown in FIGS. 2B and 4, the nesting or stacked configurations provide the ability for many mobile battery powered kiosks 100, 200 be stored together in a small amount of space. This compact design profile is ideal for many consumers with limited storage space and/or limited retail space, and also allows for many battery powered kiosks 100, 200 to be rolled out and managed by only a few employees. Furthermore, when the kiosks 100, 200 are nested or stacked together they may also be electrically coupled together to allow the stack of nested kiosks to all charge at the same time, with only one being plugged in, such as by daisy chaining (shown in FIG. 4). Additionally, the interactive touch screens 102 and/or computers of the battery powered kiosks 100, 200 may be operatively coupled together during nesting (hardwired or wirelessly). In some embodiments, the mobile battery powered kiosks 100, 200 may be coupled together to run diagnosis testing, perform system maintenance, update software, and/or sync all electronic components, for example.

In operation, these mobile battery powered kiosks 100, 200 may be rolled out (already fully charged) for temporary use at events, concerts, arenas, or when customer need is higher. When the event is over, or the customer no longer needs so many point-of-sale kiosks, then employees may extend or pull out the handles 118, 218, and use the handles 118, 218 to help guide or roll the kiosks 100, 200 into alignment with one another (i.e., align wheeled base portions 104) such that they are nested or stacked together, as shown in FIGS. 2B and 4. In this nested or stacked configuration, many kiosks 100, 200 may be simultaneously pushed or rolled between locations, such as into a storage area for charging, for example. Once in the storage or charging area, a few employees can manage or maintain a large number of the mobile battery powered kiosks 100, 200, such as by swapping or charging batteries 120, refilling printer paper, removing and/or refilling change or cash dispensers, and/or performing other maintenance tasks.

While various embodiments of devices and systems and methods for using the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A mobile battery powered kiosk, comprising:
a wheeled frame having a wheeled base portion and a thin, vertical upright portion extending therefrom and a handle coupled thereto, wherein a depth of the upright portion as measured from a front of the upright portion to a back of the upright portion is smaller than a width of the upright portion as measured from a left side of the upright portion to a right side of the upright portion;
an interactive touch screen mounted to the upright portion of the wheeled frame and operably coupled to a computer having Wi-Fi or other wireless communication capability; and
a battery operably coupled to the interactive touch screen to provide power thereto;
wherein the wheeled frame, and the upright portion thereof, are sized and shaped to nest with similar wheeled frames, and upright portions thereof, of other mobile battery powered kiosks, allowing multiple mobile battery powered kiosks to be stacked or nested together for compact storage; and
wherein the battery is removable from the side of the upright portion for charging while the multiple battery powered kiosks are stacked or nested together for compact storage.

2. The mobile battery powered kiosk of claim 1, wherein the handle is a collapsible handle.

3. The mobile battery powered kiosk of claim 2, wherein the collapsible handle folds downward to lie flat against the vertical portion of the wheeled frame.

4. The mobile battery powered kiosk of claim 1, wherein the battery is not removable and is charged within the mobile battery powered kiosk by plugging into a power outlet.

5. The mobile battery powered kiosk of claim 1, further comprising security features to securely lock wheels on the wheeled frame, battery, interactive touch screen, and a money slot or change dispenser, to prevent theft or unauthorized tampering.

6. The mobile battery powered kiosk of claim 1, wherein the battery can be charged when nested or stacked together with other kiosks via a daisy chain.

7. The mobile battery powered kiosk of claim 1, forming part of a system for nesting multiple mobile battery powered kiosks together, the system further comprising at least one other mobile battery powered kiosk, by connecting the mobile battery powered kiosk to the at least one other mobile battery powered kiosk for compact storage and battery recharging.

8. The system of claim 7, wherein the mobile battery powered kiosk and at least one other mobile battery powered kiosk may be charged together simultaneously by daisy chaining when nested together.

9. The system of claim 7, wherein the at least one other mobile battery powered kiosk further comprises a collapsible handle, and wherein the collapsible handle is recessed or retracted into the upright portion when nested together with the mobile battery powered kiosk.

10. The system of claim 7, wherein the at least one other mobile battery powered kiosk further comprises a battery, and wherein the battery is not removable and is charged by plugging into a power outlet.

11. A method for nesting multiple battery powered kiosks together, comprising:
guiding the wheeled frame of the mobile battery powered kiosk of claim 1 into alignment with a wheeled frame of another mobile battery powered kiosk, such that the mobile battery powered kiosk and the another mobile battery powered kiosk nest together for compact storage and battery recharging.

12. A system for nesting multiple mobile battery powered kiosks together, comprising:
at least one mobile battery powered kiosk, comprising:
a wheeled frame having a wheeled base portion and a thin, vertical upright portion extending therefrom, wherein a depth of the upright portion as measured from a front of the upright portion to a back of the upright portion is smaller than a width of the upright portion as measured from a left side of the upright portion to a right side of the upright portion;
an interactive touch screen securely mounted to the upright portion of the wheeled frame and operably coupled to a computer having Wi-Fi or other wireless communication capability; and a battery secured within the upright portion of the wheeled frame and electrically coupled to the interactive touch screen to provide power thereto;

wherein the at least one mobile battery powered kiosk is nested together with at least one other mobile battery powered kiosk, by pushing the wheeled frame and upright portions together, to align and nest closely together for compact storage and efficient battery recharging; and wherein the battery is removable from the side of the upright portion for charging while the multiple battery powered kiosks are stacked or nested together for compact storage.

13. The system of claim 12, wherein the at least one mobile battery powered kiosk and the at least one other mobile battery powered kiosk may be charged together simultaneously by daisy chaining when nested.

14. The system of claim 12, wherein the battery is not removable and is charged by plugging into a power outlet.

15. The system of claim 12, wherein the at least one mobile battery powered kiosk further comprises security features positioned on the wheeled frame to prevent theft.

16. A method for nesting multiple mobile battery powered kiosks together, comprising:

positioning at least one mobile battery powered kiosk, wherein the at least one mobile battery powered kiosk comprises:

a wheeled frame having a wheeled base portion and a thin, vertical upright portion coupled thereto extending therefrom, wherein a depth of the upright portion as measured from a front of the upright portion to a back of the upright portion is smaller than a width of the upright portion as measured from a left side of the upright portion to a right side of the upright portion;

an interactive touch screen securely mounted to the upright portion of the wheeled frame and operably coupled to a computer having Wi-Fi or other wireless communication capability; and a battery operably coupled to the interactive touch screen for providing power thereto; and guiding the wheeled frame of the at least one mobile battery powered kiosk into alignment with a wheeled frame of another mobile battery powered kiosk, such that they nest together for compact storage and battery recharging; and wherein the battery is removable from the side of the upright portion for charging while the multiple battery powered kiosks are stacked or nested together for compact storage.

17. The method of claim 16, further comprising the step of electrically coupling the at least one mobile battery powered kiosk with the another mobile battery powered kiosk, when they are nested together, such that both the at least one mobile battery powered kiosk and the another mobile battery powered kiosk are charged simultaneously via a single plug-in.

18. The method of claim 16, wherein the battery of the at least one mobile battery powered kiosk can be swapped out when nested together with the another mobile battery powered kiosk.

19. The method of claim 16, wherein the method further comprises activating a lockable security feature positioned on the wheeled frame to secure the at least one mobile battery powered kiosk.

\* \* \* \* \*